E. W. CORNELL.
CULTIVATOR ATTACHMENT.
APPLICATION FILED FEB. 3, 1910.
973,480.
Patented Oct. 25, 1910.
2 SHEETS—SHEET 1.
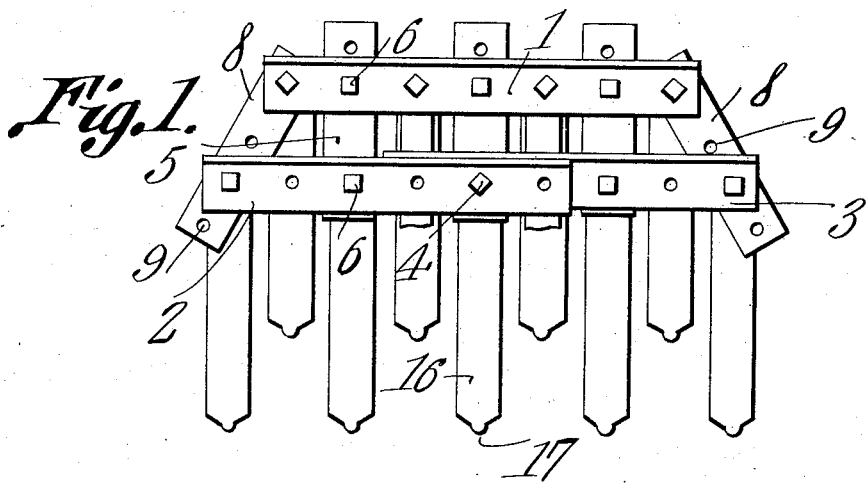
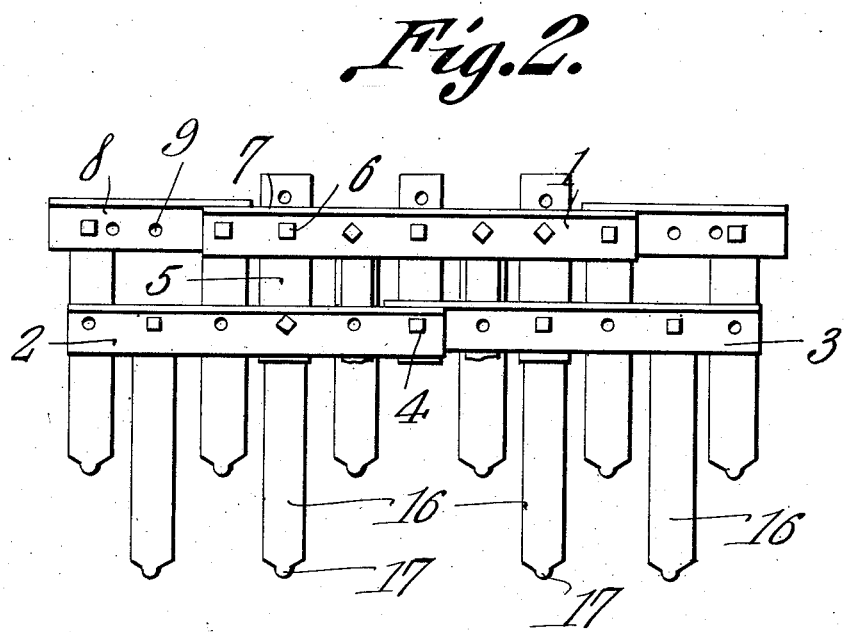
Witnesses
Inventor
Elmer W. Cornell.
By C. A. Snow & Co.
Attorneys E. W. CORNELL.
CULTIVATOR ATTACHMENT.
APPLICATION FILED FEB. 3, 1910.
973,480.
Patented Oct. 25, 1910.
2 SHEETS—SHEET 2.
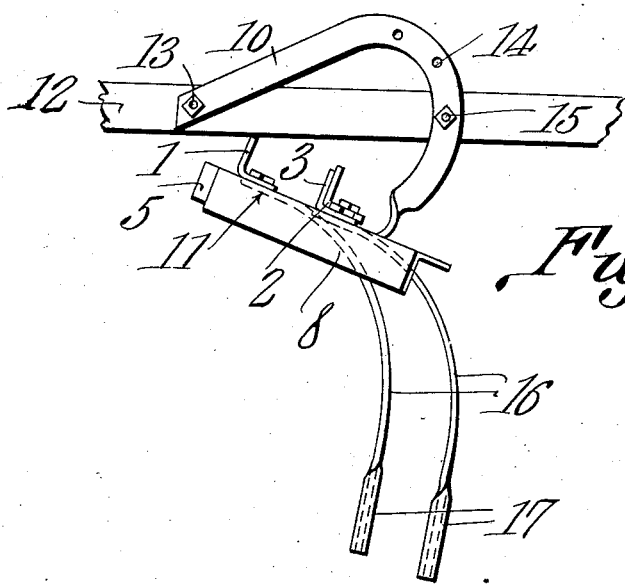
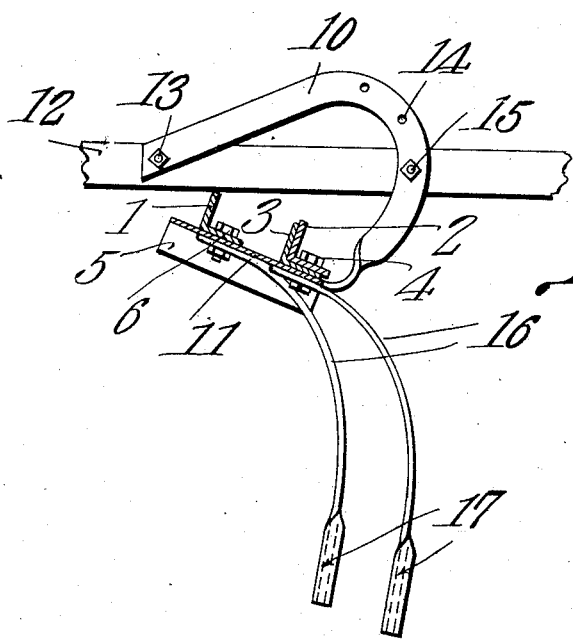
Witnesses
E. F. Stewart
J. F. Lawson
Inventor
Elmer W. Cornell.
By C. A. Snow & Co.
Attorneys

UNITED STATES PATENT OFFICE.

ELMER W. CORNELL, OF TRAVERSE CITY, MICHIGAN.

CULTIVATOR ATTACHMENT.

973,480.   Specification of Letters Patent.   Patented Oct. 25, 1910.

Application filed February 3, 1910. Serial No. 541,688.

*To all whom it may concern:*

Be it known that I, ELMER W. CORNELL, a citizen of the United States, residing at Traverse City, in the county of Grand Traverse and State of Michigan, have invented a new and useful Cultivator Attachment, of which the following is a specification.

This invention has relation to cultivator attachments and it consists in the novel construction and arrangement of its parts as hereinafter shown and described.

The object of the invention is to provide an attachment of simple and light structure adapted to be applied to the frame of a cultivator to be used as a weeder and soil pulverizer.

With the above object in view, the attachment includes a frame made up of bars (preferably of angle iron) which may be so connected and over-lapped as to securely brace each other and brackets mounted upon the frame of which the said bars form component parts, whereby the attachment may be connected with the frame of a cultivator. Spring arms may be adjustably connected with the frame as indicated, and the said arms may carry teeth adapted to engage the soil and operate as weeders or pulverizers.

In the accompanying drawings:—Figure 1 is a top plan view of the attachment showing one arrangement of the component parts of the frame thereof. Fig. 2 is a top plan view of the attachment showing another arrangement of the component parts of the frame thereof. Fig. 3 is an end elevation of the attachment. Fig. 4 is a vertical sectional view of the attachment.

The frame of the attachment includes a perforated front bar 1 and perforated rear bars 2 and 3. The inner end portions of the rear bars 2 and 3 overlap each other, and the said bars are secured together by passing a bolt through registering perforations therein. Inasmuch as the bars 2 and 3 are provided each with a series of perforations, it is apparent that the said bars may be adjusted longitudinally and secured in adjusted position. Cross-bars 5 are located under the bars 1, 2 and 3, and are adjustably secured at their forward ends to the bar 1 by means of bolts 6 which pass transversely through the said bars and any one of a series of perforations 7, with which each cross-bar 5 is provided. The rear portions of the bars 5 are secured either to the bar 2 or the bar 3. Thus it will be seen that means is provided for spacing the bar 1 at any desired distance from the rear bars 2 and 3. The bars 5 are normally disposed at the right angles to the bars 1, 2 and 3, as illustrated in Figs. 1 and 2 of the drawings. End bars 8 are provided and the said bars are each provided with a series of bolt perforations 9. The bars 8 may be connected with the ends of the bar 1 at their forward ends, and adjustably connected at their rear ends with the outer ends of the bars 2 and in the manner as illustrated in Fig. 1 of the drawings, or the bars 9 may be alined with the bar 1 and secured to the ends thereof in the manner as illustrated in Fig. 2 of the drawings.

Curved brackets 10 are mounted upon the bars 1, 2 and 3 and are provided with plane sections 11, which are adapted to lie under the said bars 1, 2 and 3, and which are secured to the said bars by means of the bolts used for securing the bars together or bolts (hereinafter to be mentioned), which attach spring arms to the frame structure. When the attachment is applied to the frame 12 of a cultivator, or similar implement, a bolt 13, is passed through the forward end of the brackets 10, and the said brackets are provided at points between their ends, each with a series of bolt perforations 14, any one of which may receive a bolt 15 for adjustably connecting the intermediate portions of the said brackets to the frame 13 of the cultivator, or other implement. By providing the perforations 14 in the brackets 10 it is possible to vary the angle of the plane of the frame of the attachment with respect to the frame of the cultivator. Spring arms 16 are bolted at their upper ends to the under sides of the bars 1, 2, 3 and 8, and the said arms 16 are provided at their lower ends with sockets 17 adapted if so desired to receive teeth (not shown).

When the parts of the attachment are arranged as illustrated in Fig. 1 of the drawings, it is adapted to operate upon the soil between adjacent rows of plants and when the parts are arranged as illustrated in Fig. 2, the attachment may serve as a straddle row device for the purpose of operating upon soil at the opposite sides of a single row of standing plants. It will be seen that by reason of the several sets of bars which form the frame of the attachment that quite a number of adjustments may be effected in order that the spring arms 16 may be so positioned that they or the teeth carried thereby may operate to the best advantage upon the soil.

While in Figs. 3 and 4 of the drawings the brackets 10 are illustrated with their ends forwardly disposed, it will be apparent that the said brackets may be turned around so that their intermediate curved portions will be forwardly disposed, if such an arrangement should be desired.

The bars 1, 2, 3, 5 and 8 are preferably made from angle iron or steel and when any of the said bars are in alinement with each other, their ends may be overlapped in order that the frame structure may be effectually braced.

Having described the invention what I claim as new and desire to secure by Letters-Patent is:—

A cultivator attachment comprising a frame made up of a front bar with auxiliary bars adjustably attached to its ends, over-lapped rear bars adjustably connected together, cross-bars adjustably connected with the front and rear bars, securing bolts for fixing the over-lapped and intersecting bars together, brackets connected with the front and rear bars of said frame, and adapted to be adjustably connected with a supporting frame, and spring arms connected with said front and rear bars of the attachment frame.

In testimony that I claim the foregoing as my own, I have hereto affixed my signature in the presence of two witnesses.

ELMER W. CORNELL.

Witnesses:
   EDWARD MONROE,
   CHRISTINE HORMUTH.